United States Patent [19]

Hanes

[11] Patent Number: 4,886,484
[45] Date of Patent: Dec. 12, 1989

[54] TORSIONAL SPRING TENSIONER WITH STABILIZER

[75] Inventor: David A. Hanes, Holland Landing, Canada

[73] Assignee: Litens Automotive Partnership, Woodbridge, Canada

[21] Appl. No.: 360,302

[22] Filed: Jun. 2, 1989

[51] Int. Cl.$^4$ .............................................. F16H 7/12
[52] U.S. Cl. .............................................. 474/135
[58] Field of Search ................... 474/101, 109–111, 474/113–117, 133, 135, 136, 138

[56] References Cited

U.S. PATENT DOCUMENTS

| | | | |
|---|---|---|---|
| 4,285,676 | 8/1981 | Kraft | 474/135 |
| 4,473,362 | 9/1984 | Thomey et al. | 474/135 |
| 4,525,152 | 6/1985 | Speer | 474/133 |
| 4,813,915 | 3/1989 | Kotzab | 474/135 X |

Primary Examiner—Thuy M. Bui
Attorney, Agent, or Firm—Cushman, Darby & Cushman

[57] ABSTRACT

A belt tensioner suitable for use with an automotive serpentine belt system comprising a fixed structure adapted to be mounted on an automotive engine, a pivoted structure mounted on the fixed structure for pivotal movement about a pivotal axis between an installation position and a maximum extension position, a torsional metal spring operatively connected between the fixed structure and the pivoted structure for resiliently biasing the pivoted structure toward the maximum extension position, and a belt engaging pulley rotatably mounted on the pivoted structure for rotational movement about a rotational axis spaced from the pivotal axis. The torsional metal spring is in the form of a helical coil having opposite end portions connection with the fixed and pivoted structures respectively with a major portion of the helical coil formation between the opposite end portions being disposed in spaced relation with the fixed and pivoted structures. A spring stabilizer is mounted in engagement with the interior of the major portion of the coil formation for altering the natural frequency of the torsional spring and damping the effects of torsional inertia imposed on the spring by the pivotal movements of the pivoted structure.

6 Claims, 2 Drawing Sheets

TORSIONAL SPRING TENSIONER WITH STABILIZER

This invention relates to belt tensioners and, more particularly, to belt tensioners of the type embodied in automotive vehicle serpentine belt systems.

Within the last several years, more and more automobiles are built utilizing serpentine belt systems. These systems utilize automatic belt tensioners. Most of the automatic belt tensioners heretofore utilized consist essentially of a fixed structure which is usually mounted on the engine, a pivoted structure which is mounted on the fixed structure for pivotal movement about a fixed axis, and a belt-engaging pulley which is rotatably mounted on the pivoted structure for rotation about an axis parallel to the pivotal axis of the pivoted structure. The pivoted structure is biased in a direction to engage the pulley with the belt and thus automatically tension the belt at all times. A popular biasing mechanism is to simply utilize a metal torsional coil spring. Usually, they are of helical coil formation with one end being connected to the fixed structure and the opposite end being connected with the pivoted structure. As the pivoted structure moves, the coils of the helical coil formation expand and contract in diameter in accordance with the pivotal movements. Consequently, the major portion of the coil formation cannot be confined by engagement with structure in order to allow for this expansion and contraction of the coils. Since the coils are largely free from structural contact, they tend to independently vibrate and move by their own inertia as the pivoted structure moves. These independent vibrational movements can reach resonant frequencies with respect to the natural frequency of the coils with the attendant disadvantages to the overall operation.

Accordingly, it is an object of the present invention to provide an automatic tensioner which overcomes these disadvantages. In accordance with the principles of the present invention, this objective is achieved by providing a belt tensioner which is suitable for use with an automotive serpentine belt system comprising a fixed structure adapted to be mounted on an automotive engine and a pivoted structure mounted on the fixed structure for pivotal movement about a pivotal axis between an installation position and a maximum extension position. A torsional metal spring is operatively connected between the fixed structure and the pivoted structure for resiliently biasing the pivoted structure toward the maximum extension position. A belt-engaging pulley is rotatably mounted on the pivoted structure for rotational movement about a rotational axis spaced from the pivotal axis. The torsional metal spring is in the form of a helical coil having opposite end portions connected with the fixed and pivoted structures respectively with a major portion of the helical coil formation between the opposite end portions being disposed in spaced relation with the fixed and pivoted structures. A spring stabilizer is mounted in engagement with the interior of the major portion of the coil formation for altering the natural frequency of the torsional spring and damping the effects of torsional inertia imposed on the spring by the pivotal movements of the pivoted structure.

Preferably, the spring stabilizer comprises a leaf spring flexed into a generally U-shaped configuration and engaged within the interior of the coil formation by the flexure thereof. Preferably, this self-engagement is accomplished by having the central portion of the U-shaped leaf spring contact the interior of the coil formation at a central position thereon and opposite ends of the U-shaped leaf spring contact the interior of the coil formation at positions displaced more than 90° in opposite directions from the central position.

Another object of the present invention is to provide a tensioner having an improved spring stabilizer which is simple in construction, effective in operation, and economical to manufacture and assemble.

These and other objects of the present invention will become more apparent during the course of the following detailed description and appended claims.

The invention may best be understood with reference to the accompanying drawings wherein an illustrative embodiment is shown.

IN THE DRAWINGS:

FIG. 4 is a fragmentary sectional view taken along the line 4—4 of FIG. 1.

Figure 1:
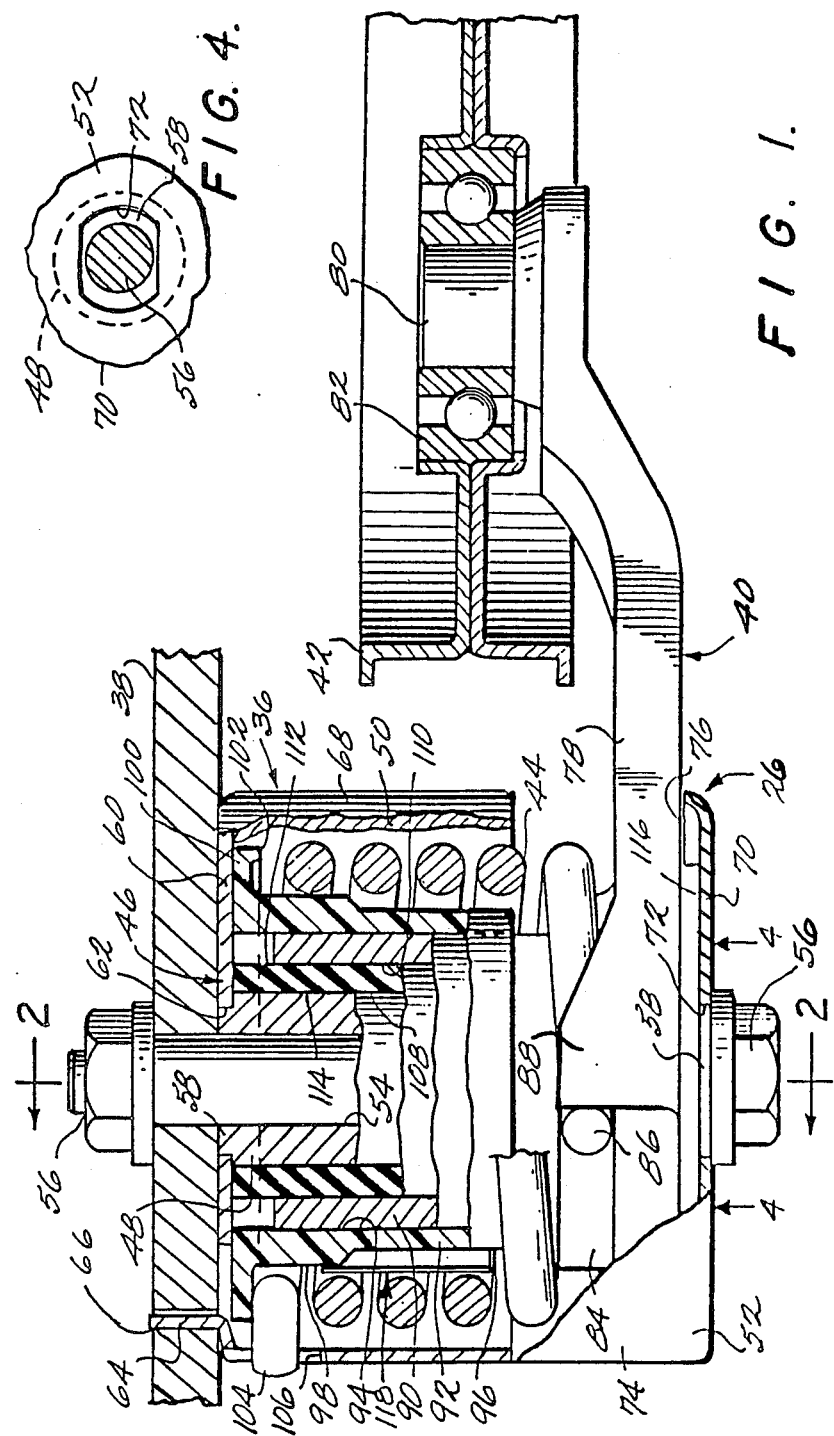
FIG. 1 is a top plan view of an automatic tensioner embodying the principles of the present invention, with parts broken away for purposes of clearer illustration.

Referring now more particularly to the drawings, there is shown therein a belt tensioner, generally indicated at 26, embodying the principles of the present invention. As shown, the tensioner 26 includes a fixed structure 36 which is adapted to be secured to a bracket plate or the like in a stationary position with respect to an engine block of an automotive vehicle engine having a serpentine belt system associated therewith. The belt tensioner 26 also includes a pivoted structure 40 which is mounted with respect to the fixed structure 36 for pivotal movement about a fixed axis between a first or installation limiting position and a second or maximum extension limiting position. The pivoted structure 40 carries a belt engaging pulley 42 for rotational movement about a second axis parallel with the first axis. A metal torsional coil spring 44 is mounted between the fixed structure 36 and pivoted structure 40 for resiliently biasing the latter to move in a direction away from the first limiting position thereof toward the second limiting position with a spring force which decreases as the pivoted structure is moved in a direction away from the first position toward the second position.

The present invention is particularly concerned with the provision of a stabilizing or damping means for stabilizing or damping the movements of the coils of the coil spring 44 which is separate from and distinctly different from any primary damping means that may be provided for the purpose of damping the pivotal movements of the pivoted structure 40. The present invention contemplates any known primary damping means, however, it is preferable to utilize a damping mechanism, generally indicated at 46, of the proportional type which serves in operation to provide damping by a damping force which decreases as the pivoted structure 40 is moved in a direction away from its first position toward the second position thereof. The type of proportional damping preferred is disclosed in commonly assigned U. S. Pat. No. 4,473,362, the disclosure of which is hereby incorporated by reference into the present specification.

The fixed structure 36 may assume a variety of different configurations; however, as shown, it is made up of a rigid core member 48 and a pair of housing shell parts 50 and 52. Core member 48 is generally cylindrical in shape and has a central opening 54 extending longitudinally therethrough for receiving a bolt assembly 56 which serves to detachably secure the fixed structure 36 to the bracket 38. As best shown in FIG. 4, each end of the core member 48 includes a reduced portion 58 formed with peripheral parallel flat surfaces. Housing shell part 50 includes a circular end wall 60 having a central opening 62 shaped to receive the associated end portion 58 of the core member 48. The end wall 60 has a tab 64 struck therefrom and bent outwardly for engaging within an opening 66 formed within the bracket 38 so as to prevent the fixed structure 36 from moving with respect to the bracket about the axis of the bolt assembly 56 and core member 48.

The shell part 50 also includes a cylindrical peripheral wall 68 extending axially from the periphery of the end wall 60 to an extent considerably less than the axial extent of the core member 48. The other housing shell part 52 includes a generally circular end wall 70 having a central opening 72 similar to the opening 62 shaped to engage the other core member end portion 58. The housing shell part 52 includes a segmental peripheral wall 74 which extends from the periphery of the end wall 70 into abutting relation with a segmental portion of the peripheral wall 68 of the housing shell part 50. The parts 50 and 52 thus provide a housing which is closed peripherally except for an angular opening 76 through which an arm portion 78 of the pivoted structure 40 extends.

Figure 2:
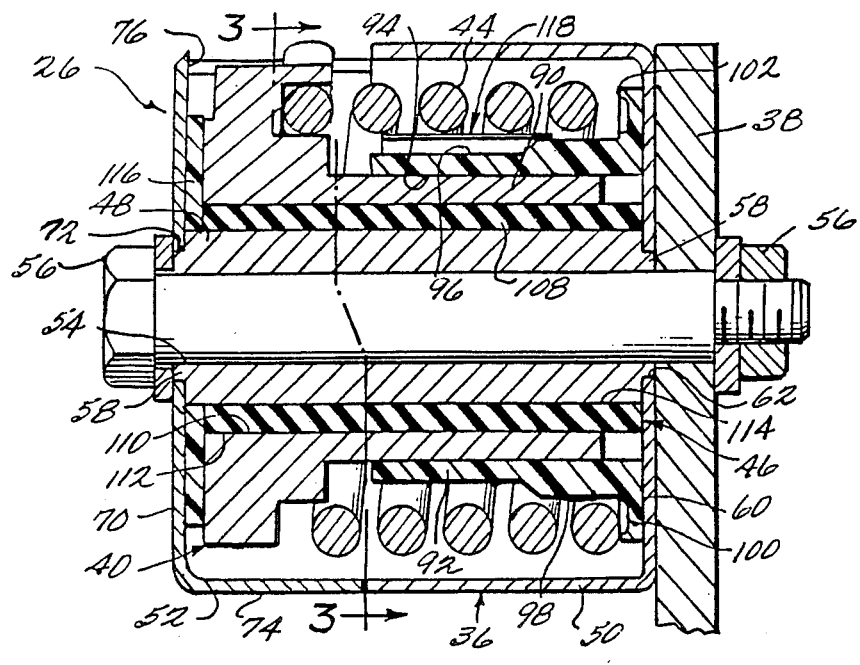
FIG. 2 is a sectional view taken along the line 2—2 of FIG. 1.
Figure 3:
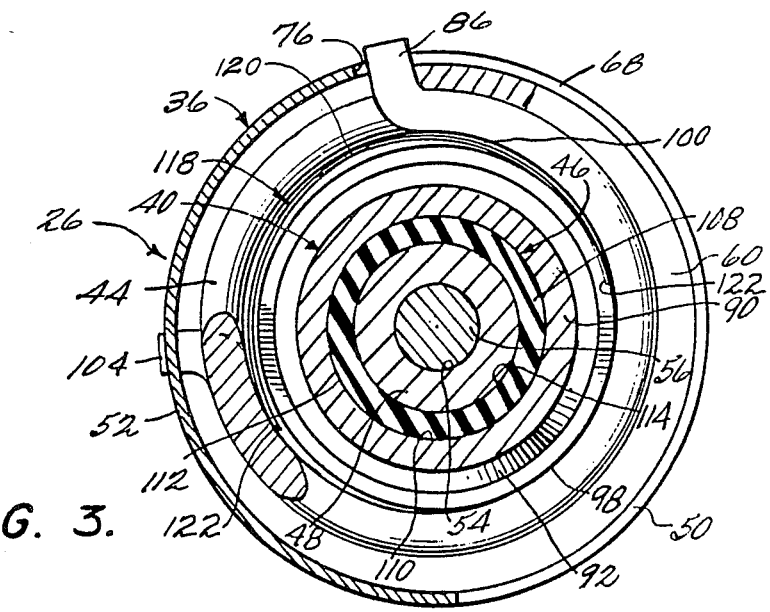
FIG. 3 is a sectional view taken along the line 3—3 of FIG. 2.

As best shown in FIG. 1, the free end of the arm portion 78 of the pivoted structure 40 has an integral stub shaft 80 formed thereon on which the pulley 42 is journaled, as by a ball bearing 82 or the like. The opposite end of the arm which extends through the opening 76 into the housing is of enlarged circular configuration and has an annular boss 84 extending axially therefrom of an exterior diameter size sufficient to extend within the interior of the coil spring 44 on one side thereof. As best shown in FIGS. 1-3, one end volute of the coil spring 44 extends around the annular boss 84 and has its extremity bent generally radially outwardly, as indicated at 86, so as to engage an overhanging stop portion 88 formed integrally within the adjacent periphery of the arm portion 78.

The pivoted structure 40 also includes a cylindrical mounting sleeve portion 90 which is integral with the annular boss portion 84 and extends axially outwardly therefrom. The exterior diameter size of the cylindrical mounting portion 90 is less than the exterior diameter size of the annular boss 84 and the interior diameter size of the cylindrical core member 48. As shown, the axial size of the cylindrical mounting portion 90 is such as to extend almost to the circular end wall of the housing part 50.

Mounted in sliding relation with the exterior periphery of the cylindrical mounting portion 90 is a spring bearing member, generally indicated at 92. Preferably, the bearing member is molded of a plastic material, a preferred plastic being Zytel®. The bearing member 92 is formed with a cylindrical interior peripheral surface 94 of a size to engage the exterior peripheral surface of the cylindrical mounting portion 90. The inner end portion of the bearing member 92 is formed with an exterior peripheral surface 96 of a size substantially smaller than the interior of the spring 44. The opposite outer end portion is formed with an exterior peripheral surface 98 of a slightly greater size. An annular flange 100 extends radially outwardly from the outer extremity of the bearing member 92 and is disposed in engagement with the inner surface of the circular end wall 60 of the housing 50. Flange 100 is formed at its outer periphery with an axially inwardly extending rib 102.

The spring 44 has its opposite end bent radially outwardly as indicated at 104 in a manner similar to the radially outwardly bent end 86. The outwardly bent end 104 of the spring is adapted to engage within a slot 106 formed in the peripheral wall 68 of the housing part 50. As best shown in FIG. 1, the slot 106 preferably extends at an angel of approximately 45° with respect to a radial plane. The slot thus enables the end of the spring 104 to be initially mounted therein at the axially inner end thereof so that the stressing of the spring during assembly, which tends to move the end portion 104 to the right as shown in FIG. 2, also tends to move the same axially outwardly into engagement with the rib 102. As shown in FIG. 1, the engagement of the spring end portion 104 with the rib serves to depress or deform the rib and in this way to positively lock the bearing member 92 against rotation with respect to the fixed structure. However, the arrangement does not positively prevent sliding movement of the bearing member 92 in a direction transverse to the axis of rotation.

The damping mechanism 46 is in the form of a sleeve body 108 of a material chosen to suit the vibrational characteristics of the system within which the belt tensioner 26 is used. A preferred material for the damping sleeve body 108 is Zytel 103HSL (nylon made by du-Pont). Where Zytel is utilized as the material for the damping sleeve body 108, the damping action provided is essentially all sliding friction damping.

As best shown in FIG. 2, the pivoted structure 40 includes a cylindrical interior peripheral surface 110 which extends axially therethrough and defines the interior of the cylindrical mounting portion 90. Damping sleeve body 108 has an exterior peripheral surface 112 of a size to enable the sleeve body to fit loosely within the pivoted structure surface 110. The damping sleeve body includes an interior peripheral surface 114 which closely engages the exterior peripheral surface of the core member 48. One end of the damping sleeve body 108 engages the inner surface of the end wall 60 of the housing part 50, while the opposite end thereof engages a washer 116 which also seats against the adjacent surface of the pivoted structure 40 and the inner surface of the end wall 70 of the housing part 52. Preferably, the washer is of material similar to the bearing member 92 as, for example, Zytel 101®.

The damping mechanism 46 effects damping by relative surface sliding between two relatively movable friction surfaces, namely, the exterior periphery 112 of the damping body 108 and the inner periphery of the mounting portion 90. Friction surface sliding dampens the movements of the pivoted structure 40 by applying a torque resistance to the pivotal movement. This torque resistance is equal to the force required to overcome the frictional surface sliding resistance of the two sliding surfaces multiplied by the distance the sliding surfaces are from the pivotal axis of the pivoted structure. The frictional surface sliding resistance is, in turn, a function of the coefficient of friction of the materials used to form the sliding surfaces, the area of surface contact and the pressure between the sliding surfaces. Since the materials once chosen are constant and the contacting surface area does not appreciably change, variation is achieved by variation of the pressure between the sliding surfaces. In order to provide this variation, a variable damping force from the coil spring 44 is applied radially so as to vary the pressure between the surfaces.

A radial spring force component is transmitted by the spring 44 to the opposite end of the core member by virtue of the provisions of the relatively short axial peripheral surface 98 of the spring bearing member 92 which serves as the sole means for transmitting the radial spring force component to the core member through the mounting portion 90 of the pivoted structure 40 and the damping body 108. Moreover, the radial spring applied damping force is directional so as to tend to balance the forces acting on the pivot bearing for the pivoted structure. That is, the damping force acts in the same direction as the pulley load force and is applied in an axial position such as to effectively balance the pulley load force.

With this particular mounting of the torsional coil spring, almost the entire extent of the helical coil formation is free from contact with other structure and is therefore subject to independent vibration at its natural frequency and the independent effects of its own inertia. Moreover, since the individual coils of the helical coil formation must be allowed to expand and contract, it is an inherent characteristic of torsional coil springs when used as the biasing means of tensioners that at least a majority of the extent of the coils is not directly contacted, thus presenting the possibility of independent resonant vibration.

In accordance with the principles of the present invention in order to alter the natural frequency of the spring 44 and to dampen the effects of torsional inertia imposed on the coils of the spring 44, there is mounted in engagement with the interior of the major free portion of the coil formation of the spring 44 a spring stabilizer or damper, generally indicated at 118.

Preferably, the stabilizer 118 is in the form of a relatively light leaf spring flexed into a generally U-shaped configuration and engaged with the interior of the coil formation by the flexure thereof. As shown, the U-shaped configuration of the leaf spring includes a central portion 120 and two free end portions 122. As shown, the central portion 120 of the U-shaped leaf spring contacts the interior of the coil formation at a central position thereon and opposite free ends 122 of the U-shaped leaf spring contact the interior of the coil formation at positions displaced slightly more than 90° in opposite directions from the central position. This relationship is best shown in FIG. 3. The U-shaped leaf spring stabilizer 118 constitutes a rectangular sheet of mild steel having a thickness of approximately 0.016 inches. The embodiment shown has a uniform width throughout so that the leaf spring is rectangular in plan prior to being flexed into U-shaped configuration.

The stabilizer engages the interior of the coils and, by virtue of its light spring effect, is capable of being flexed in response to the expansion and contraction of the coil spring coil formation. The end portions 122 have a frictional contact with the coils and dampen their relative expansion and contraction movements. The contact of the stabilizer with the spring materially alters the natural frequency of the spring and controls the effects of independent torsional inertia within the coil formation of the spring as well as the occurrence of resonance thereof at the natural frequency.

It thus will be understood that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed with the spirit and scope of the following claims.

What is claimed is:

1. A belt tensioner suitable for use with an automotive serpentine belt system comprising
    a fixed structure adapted to be mounted on an automotive engine,
    a pivoted structure mounted on said pivoted structure for pivotal movement about a pivotal axis between an installation position and a maximum extension position,
    a torsional metal spring operatively connected between said fixed structure and said pivoted structure for resiliently biasing said pivoted structure toward said maximum extension position,
    a belt engaging pulley rotatably mounted on said pivoted structure for rotational movement about a rotational axis spaced from said pivotal axis,
    said torsional metal spring being in the form of a helical coil having opposite end portions connected with said fixed and pivoted structures respectively with a major portion of the helical coil formation between said opposite end portions being disposed in spaced relation with said fixed and pivoted structures,
    and spring stabilizing means mounted within the interior of the major portion of the coil formation and out of contact with said fixed and pivoted structures for altering the natural frequency of said torsional spring and damping the effects of torsional inertia imposed on said spring by the pivotal movements of said pivoted structure.

2. A belt tensioner as defined in claim 1 wherein said stabilizing means comprises a leaf spring flexed into a generally U-shaped configuration and engaged within the interior of the coil formation by the flexure thereof.

3. A belt tensioner as defined in claim 2 wherein said central portion of said U-shaped leaf spring contacts the interior of the coil formation at a central position thereon and opposite ends of said U-shaped leaf spring contact the interior of the coil formation at positions displaced more than 90° in opposite directions from said central position.

4. A belt tensioner as defined in claim 3 wherein said pivoted structure and said fixed structure have operatively associated therewith damping means for damping the pivotal movements of said pivoted structure with respect to said fixed structure.

5. A belt tensioner as defined in claim 4 wherein said damping means is operable to dampen by friction surface sliding substantially all movements of the pivoted structure with a damping force which decreases as said pivoted structure is moved in a direction away from said installation position and toward said maximum extension position.

6. A belt tensioner as defined in claim 5 wherein said damping force is applied in a position tending to balance the forces acting between said fixed and pivoted structures.

* * * * *